(12) United States Patent
Jeng

(10) Patent No.: US 6,731,499 B2
(45) Date of Patent: May 4, 2004

(54) ILLUMINATION SYSTEM FOR COMPUTER HARDWARE

(75) Inventor: Jing-Chang Jeng, Ontario, CA (US)

(73) Assignee: LA Sky Hawk Computers, Inc., Ontario, CA (US)

( * ) Notice: Subject to any disclaimer, the term of this patent is extended or adjusted under 35 U.S.C. 154(b) by 30 days.

(21) Appl. No.: 10/237,586

(22) Filed: Sep. 6, 2002

(65) Prior Publication Data

US 2004/0047117 A1 Mar. 11, 2004

(51) Int. Cl.$^7$ .................................................. G06F 1/16
(52) U.S. Cl. .................... 361/683; 361/681; 362/31; 40/406
(58) Field of Search ................. 361/679, 681, 361/683; 362/31, 457, 45, 8, 26; 40/406, 407, 408, 439, 440, 441, 477, 479, 480; 349/1, 58, 65; 428/10, 18, 19

(56) References Cited

PUBLICATIONS

Lee (US patent application Publication US 2003/0202318A1).*
Kerr (US patent application Publication US 2003/0002246A1).*

* cited by examiner

Primary Examiner—Michael Datskovsky
(74) Attorney, Agent, or Firm—Frank Frisenda, Jr.

(57) ABSTRACT

An adjustable illumination system is provided to enhance the appearance and functionality of computer hardware. The illumination system comprising at least one bubble tube light source that may, for instance, be disposed on a front surface of a computer hardware casing. The bubble tube light source may conveniently be programmed by the end user for display of single color or multi-color effect. The illumination system may also comprise LCD display of time and temperature for enhancement of the panel display.

4 Claims, 6 Drawing Sheets

ILLUMINATION SYSTEM FOR COMPUTER HARDWARE

BACKGROUND OF THE INVENTION

The present invention relates to computer hardware and more particularly to an adjustable illumination system to enhance the appearance and functionality of hardware casings.

The ever increasing popularity and acceptance of personal computers have made computer hardware components a necessity in everyday life at offices and homes. For ready accessibility by the end user, computer hardware components often are kept in prominent areas such as on desktops and on living room tables. While much attention has been directed to computer component internals to enhance the speed and efficiency of computer performance, little attention has been paid to the attractiveness of the computer hardware casing. Much of the outer surface area of typical computer hardware casings is of a non-descript drab design, for instance an austere gray beige plastic surface, that provides no attributes to the office/living room decor and little attraction for the computer user. Accordingly, those skilled in the art have recognized a significant need to enhance the appearance and functionality of computer hardware casings to blend in with interior designs of the office/home. The present invention fulfills these needs.

SUMMARY OF THE INVENTION

An adjustable illumination system is provided to enhance the appearance and functionality of computer hardware. The illumination system comprises at least one bubble tube light source that may, for instance, be disposed on a front surface of a computer hardware casing. The bubble tube light source may conveniently be programmed by the end user for display of single color or multi-color effect. The illumination system may also comprise LCD display of time and temperature for enhancement of the panel display.

In one embodied form, the system further comprises a display driver circuit including a microprocessor, LCD drivers, a plurality of color LEDs and a plurality of light guiding tubes. An optional tactile switch is further included to provide automatic or selectable illumination of the LEDs to provide singular or multi-color display.

In yet another embodiment of the present invention, the illumination system further includes a display driver circuit having a microprocessor, an LCD panel, an LCD driver, color LEDs, and a temperature sensor and clock with readout display. An optional tactile switch is provided to allow the user to select the desired color display and time and temperature reading.

DETAILED DESCRIPTION OF THE PREFERRED EMBODIMENTS

An adjustable illumination system is provided to enhance the appearance and functionality of computer hardware. The illumination system comprising a bubble tube light source that may, for instance, be disposed on a front surface of a computer hardware casing. The bubble tube light source may conveniently be programmed by the end user for display of single color or multi-color effect. The illumination system may also comprise LCD display of time and temperature for enhancement of the panel display.

Figure 1:
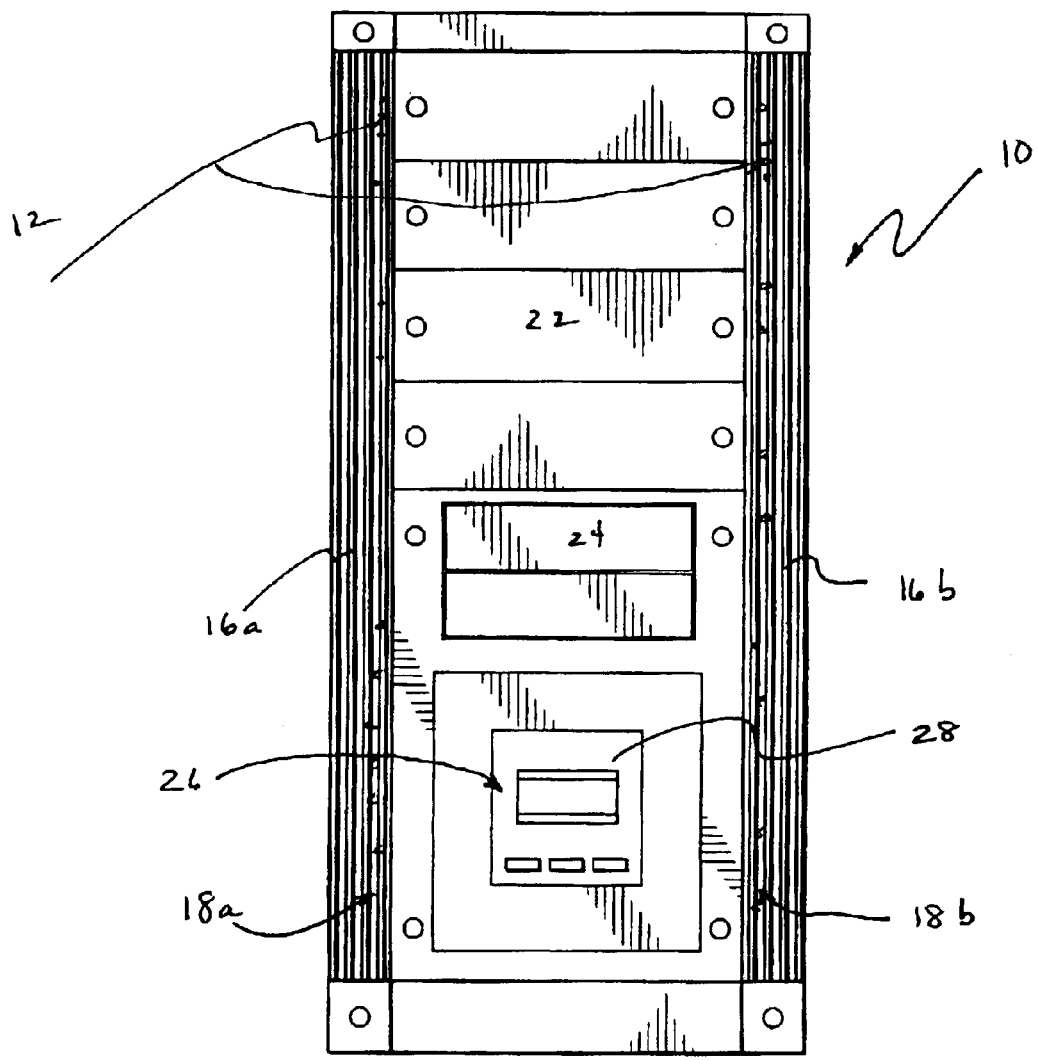
FIG. 1 is a front perspective view illustrating the casing of a computer disc drive having bubble tube light displays in accordance with one embodied form of the present invention.

Referring to FIG. 1, there is shown a front panel of a computer hard drive casing 10, comprising one embodied form of the inventive illumination system 12. The longitudinal edge portions 14a and 14b of the computer casing 10 are each fitted with mounting strips 16a and 16b for containment of two bubble tube light sources 18a and 18b. The mounting strips 16a and 16b may be preferably be made of die cast aluminum and mounted to the exterior of the computer component by means of suitable brackets or adhesive. For enhancement of the front casing surface, the casing front panel 20 may be fitted with decorative acrylic covers 22 and bay louvers 24. A time/temperature LCD display 26 having a multi-color LED window light 28 preferably completes the enhancement of the panel display. The bezel components are preferably made of plastic, aluminum film and transparent acrylic to provide the reflective and shiny surface to enhance the illumination of the bubble lights.

In one embodied form, the display driver circuit comprises a microprocessor, LCD drivers, a plurality of color LED's and a plurality of light guiding tubes. An optional tactile switch is further included to provide automatic or selectable illumination of the LED's to provide singular or multi-color display.

In yet another embodiment of the present invention, a display driver circuit comprises a microprocessor, an LCD panel, an LCD driver, color LED's, and a temperature, sensor and clock. An optional tactile switch is provided to allow the user to select the desired color display and time and temperature reading.

Figure 2:
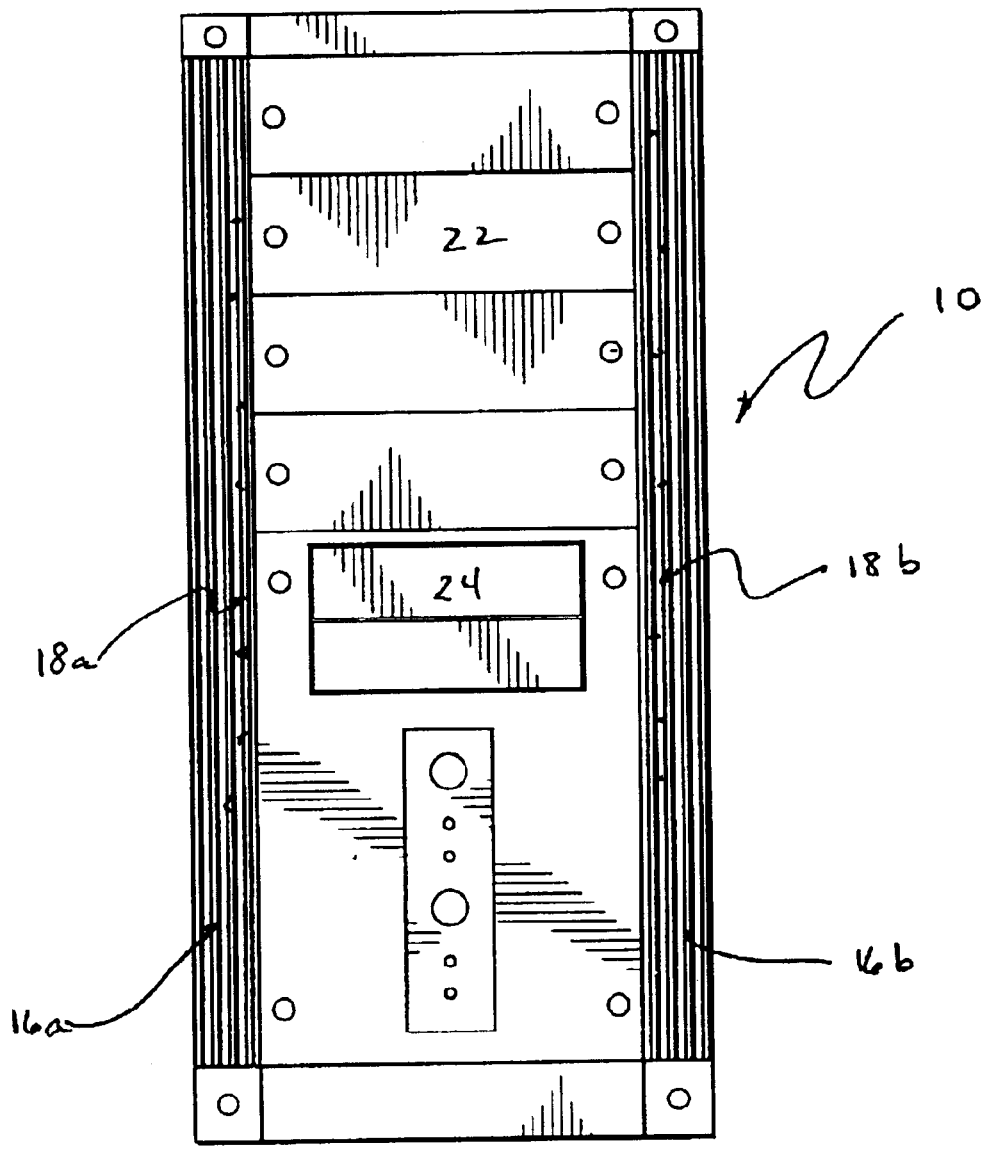
FIG. 2 is a front perspective view illustrating the casing of a computer disc drive having bubble tube light displays in accordance with a second embodied form of the present invention.

FIG. 2 is a front perspective view illustrating the casing of a computer disc drive 10 having bubble tube light displays in accordance with a second embodied form of the present invention.

Figure 3:
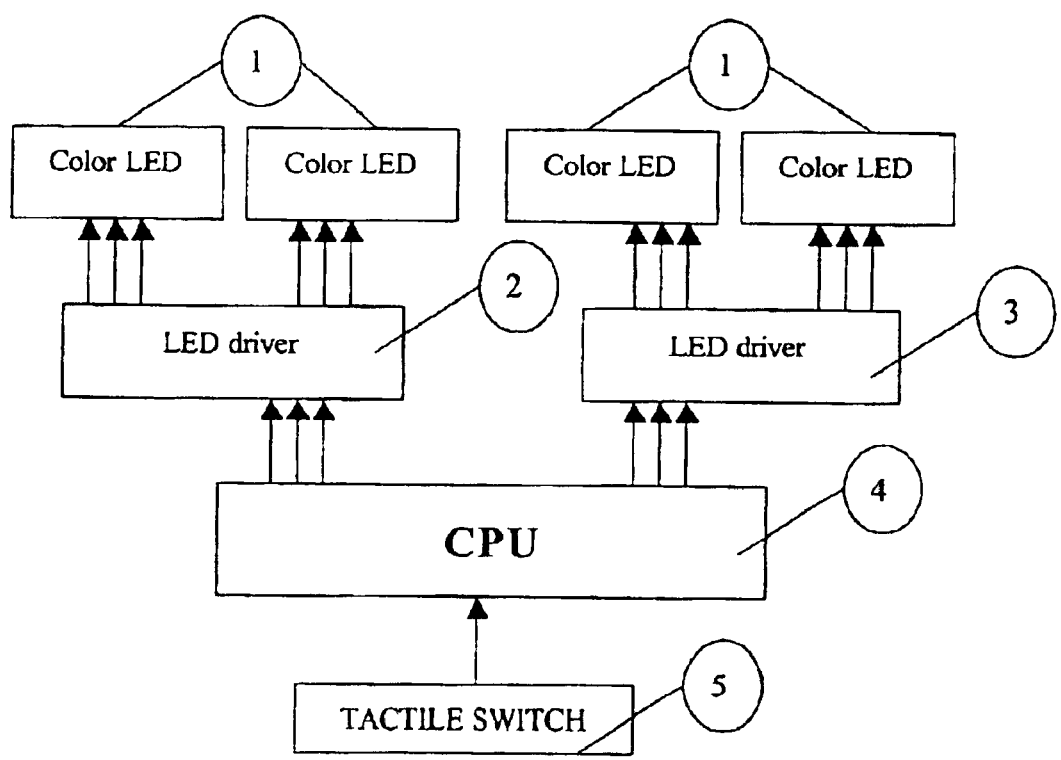
FIG. 3 is a schematic block diagram illustrating a switching mechanism and component parts for a display driver circuit in accordance with one embodied form of the present invention.

FIG. 3 is a schematic block diagram illustrating a switching mechanism and component parts for a display driver circuit in accordance with one embodied form of the present invention.

Figure 4:
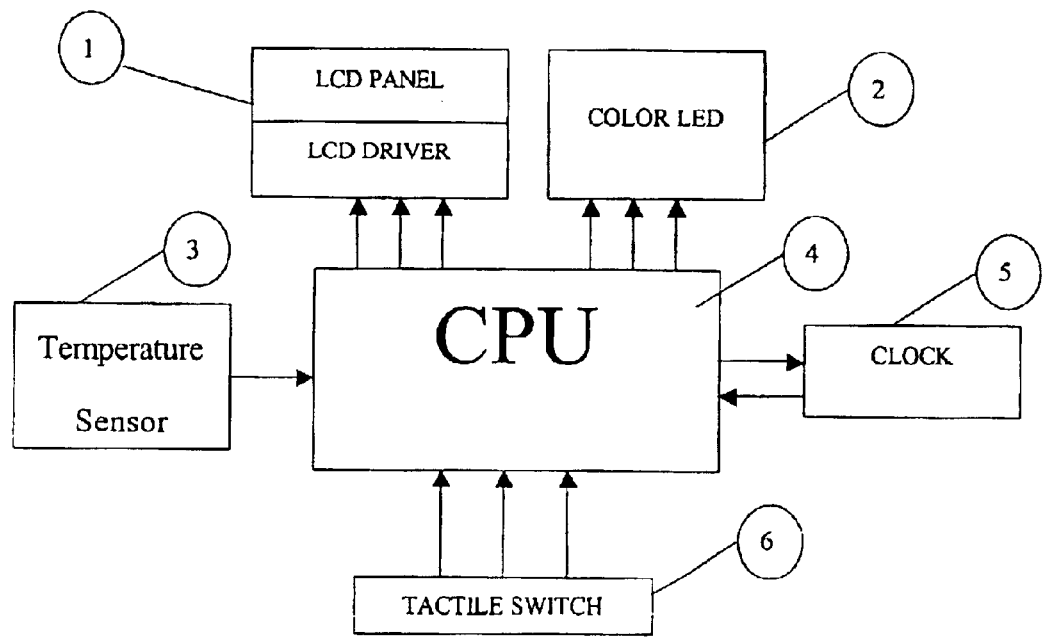
FIG. 4 is a schematic block diagram illustrating a switching mechanism and component parts for a display driver circuit in accordance with FIG. 2 of the present invention.

FIG. 4 is a schematic block diagram illustrating a switching mechanism and component parts for a display driver circuit in accordance with FIG. 2 of the present invention.

Figure 5:
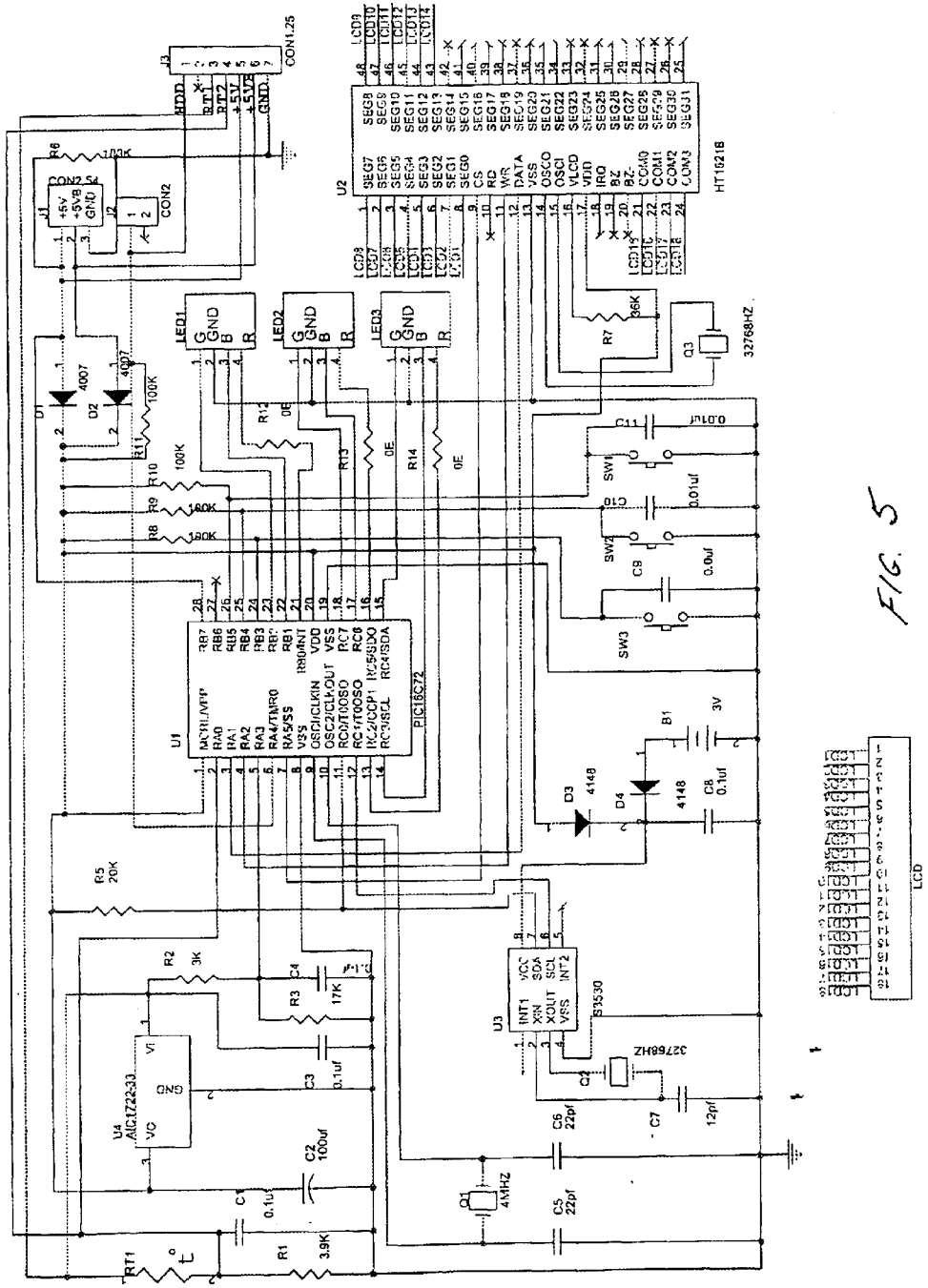
FIG. 5 is a schematic circuit diagram of the LCD key pad in accordance with one embodied form of the present invention.

FIG. 5 is a schematic circuit diagram of the LCD key pad in accordance with one embodied form of the present invention.

Figure 6:
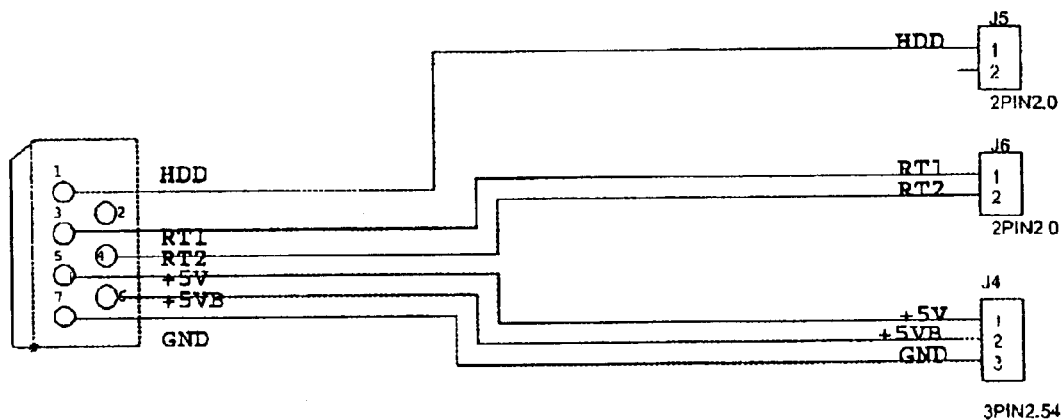
FIG. 6 is a further schematic diagram of the LCD key pad in accordance with one embodied form of the present invention.

FIG. 6 is a further schematic diagram of the LCD key pad in accordance with one embodied form of the present invention.

I claim:

1. An adjustable illumination system to enhance the appearance and functionality of computer hardware, the illumination system comprising:

a bubble tube light source disposed on a front surface of a computer hardware casing; said bubble tube light source having selection means to provide display of single color or multi-color effect.

2. The illumination system as defined in claim 1 and further comprising LCD display of time and temperature for enhancement of the panel display.

3. The illumination system as defined in claim 1 wherein the selection means comprises a display driver circuit having a microprocessor, LCD drivers, a plurality of color LED's and a plurality of light guiding tubes and switch means for automatic or selectable illumination of the LED's to provide singular or multi-color display.

4. The illumination system as defined in claim 1 wherein the selection means comprises a display driver circuit having a microprocessor, an LCD panel, an LCD driver, color LED's, a temperature sensor and clock display and tactile switch to allow the user to select the desired color display and time and temperature reading.

* * * * *